United States Patent
Fujisaki

(10) Patent No.: US 9,024,490 B2
(45) Date of Paterit: May 5, 2015

(54) CENTRAL POWER SUPPLY MEMBER

(75) Inventor: Ryuichi Fujisaki, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 128 days.

(21) Appl. No.: 13/591,284

(22) Filed: Aug. 22, 2012

(65) Prior Publication Data

US 2013/0049501 A1  Feb. 28, 2013

(30) Foreign Application Priority Data

Aug. 24, 2011  (JP) ................................ 2011-182812
Aug. 24, 2011  (JP) ................................ 2011-182813

(51) Int. Cl.
H02K 11/00  (2006.01)
H02K 3/52  (2006.01)

(52) U.S. Cl.
CPC ............ *H02K 3/522* (2013.01); *H02K 2203/09* (2013.01)

(58) Field of Classification Search
CPC ........................... H02K 2203/09; H02K 3/522
USPC ................................................ 310/71, 68 R
See application file for complete search history.

(56) References Cited

U.S. PATENT DOCUMENTS

| | | | | |
|---|---|---|---|---|
| 3,610,976 | A * | 10/1971 | Wightman .................. | 310/60 R |
| 6,737,772 | B2 * | 5/2004 | Tanaka et al. ................ | 310/71 |
| 6,936,942 | B1 * | 8/2005 | Okazaki et al. .............. | 310/71 |
| 2002/0047408 | A1 * | 4/2002 | Tanaka .......................... | 310/99 |
| 2003/0173841 | A1 * | 9/2003 | Kobayashi et al. ........... | 310/71 |
| 2005/0001494 | A1 * | 1/2005 | Kuribayashi et al. ......... | 310/71 |
| 2005/0179329 | A1 * | 8/2005 | Okazaki et al. ............... | 310/71 |
| 2006/0138883 | A1 * | 6/2006 | Yagai et al. .................... | 310/71 |
| 2008/0150377 | A1 * | 6/2008 | Yamaguchi et al. ........... | 310/71 |
| 2008/0197727 | A1 * | 8/2008 | Dubuc et al. ................... | 310/71 |
| 2008/0219867 | A1 * | 9/2008 | Sakata ........................ | 417/410.1 |
| 2009/0079280 | A1 * | 3/2009 | Terauchi et al. ................ | 310/71 |
| 2009/0108688 | A1 * | 4/2009 | Miura ............................. | 310/71 |
| 2009/0256437 | A1 * | 10/2009 | Miura et al. .................... | 310/71 |
| 2009/0256439 | A1 * | 10/2009 | Inoue et al. .................... | 310/71 |
| 2010/0033044 | A1 * | 2/2010 | Isshiki et al. ................... | 310/71 |
| 2010/0141066 | A1 * | 6/2010 | Jang et al. ...................... | 310/71 |
| 2010/0156208 | A1 * | 6/2010 | Schaflein et al. .............. | 310/71 |
| 2010/0187924 | A1 * | 7/2010 | Yagai et al. .................... | 310/71 |
| 2011/0187226 | A1 | 8/2011 | Sagara et al. | |

FOREIGN PATENT DOCUMENTS

| | | |
|---|---|---|
| JP | 6-196880 | 7/1994 |
| JP | 2004-55886 | 2/2004 |
| JP | 2009-261094 | 11/2009 |

* cited by examiner

*Primary Examiner* — Alex W Mok
(74) *Attorney, Agent, or Firm* — Gerald E. Hespos; Michael J. Porco; Matthew T. Hespos

(57) ABSTRACT

A central power supply member (S) for supplying power to windings of a stator of a motor has ring-shaped busbars (10) each including a power supply terminal (20) and connecting terminals (30) laminated and accommodated in a synthetic resin holder (50) while being insulated from each other. Power-supply side terminals (91) drawn out from a power supply are placed on the power supply terminals (20) of the busbars (10) and connected by tightening bolts (95). The holder (50) has terminal blocks (55) on which the power supply terminals (20) are placed and in which nuts (65) to be engaged with the bolts 95 are mounted with the rotation thereof prevented. Insertion grooves (88) as rotation preventing portions are formed in the rear surfaces of the terminal blocks (55) and receive bulges (27) formed on the lateral edges of vertical plates (22) of the power supply terminals (20).

9 Claims, 19 Drawing Sheets

CENTRAL POWER SUPPLY MEMBER

BACKGROUND OF THE INVENTION

1. Field of the Invention

The invention relates to a central power supply member for supplying power to windings of a stator of a motor.

2. Description of the Related Art

A vehicle brushless motor has a rotor surrounded by a ring-shaped stator. The stator includes magnetic poles formed by windings and an annular central power supply member for supplying power to the magnetic poles. Japanese Unexamined Patent Publication No. 2009-261094 discloses such a central power supply member.

The central power supply of Japanese Unexamined Patent Publication No. 2009-261094 has three bus rings formed by bending magnetic wires into polygonal rings. Each bus ring has circumferentially spaced connecting portions that are to be connected to windings. A power supply terminal is crimped and fixed to butted ends of each magnet wire. The three bus rings are laminated concentrically one over another with the power supply terminals thereof circumferentially displaced and integrally assembled by being sandwiched from radially inner and outer sides by synthetic resin clips at positions along a circumferential direction.

Power supply terminals drawn out from a power supply are laminated over the power supply terminals of the respective bus rings and fastened by a bolt and a nut. Specifically, the bolt is inserted through insertion holes in the terminals and a nut is engaged threadedly with the projecting end of the bolt, one of the nut and the bolt is screwed using a tool while the rotation of the other is prevented.

However, fastening the bolt and the nut in this way drags and rotates the power supply terminal and applies a load to the bus ring. Thus, the coating of the magnet wire forming the bus ring may be broken or the clip may be damaged. As a result, a countermeasure has been desired.

Furthermore, connecting the power supply terminal and the power-supply side terminal takes time. Therefore further improvement has been desired.

The invention was completed in view of the above situation and an object thereof is to improve overall assembling operability of a central power supply member.

SUMMARY OF THE INVENTION

The invention relates to a central power supply member for supplying power to windings of a stator of a motor. The central power supply member has plural busbars, each of which has a power supply terminal and one or more connecting terminals to the windings. The terminals are arranged one over the other and are accommodated in a holder while being insulated from each other. Power-supply side terminals drawn out from a power supply are to be placed individually on the power supply terminals of the busbars and are connected by fasteners. The holder has displacement preventing portions that engage with base ends of the power supply terminals for preventing the power supply terminals from being displaced as the fastening members are fastened. Thus, the power supply terminal will not be dragged, rotated or otherwise displaced while tightening a bolt to connect a power-supply side terminal to the power supply terminal. Accordingly, no load is applied to a part of the busbar that has the power supply terminal, thereby preventing deformation, fracture and the like.

The holder may include terminal blocks on which the power supply terminals are placed. Mating fastening members are in the terminal blocks and engage the respective fastening members may be mounted to prevent displacement. The displacement preventing portions may be formed in the terminal blocks. More particularly, the mating fastening members may be nuts that threadedly engage the bolts. The terminal blocks are configured to prevent rotation of the nuts.

The power supply terminal can be connected to the mating power-supply side terminal by placing the power supply terminal on the terminal block, placing the power-supply side terminal on the power supply terminal, inserting the bolt through the both terminals and screwing the bolt into the nut. During this time, the rotation preventing portion on the terminal block engages the power supply terminal so that the power supply terminal is not dragged and rotated as the bolt is screwed into the nut.

The power supply terminal may have a crank shape so that a base plate projects substantially radially from the busbar, a bent plate projects from the base plate and a connecting plate is connected at a substantially right angle to the bent plate. The connecting plate of the power supply terminal may be placed on the upper surface of the terminal block while the bent plate is placed substantially along a lateral or rear part of the terminal block.

The lateral or rear part of each terminal block may be have one or more insertion grooves that receive lateral edges of the bent plate of the power supply terminal and form the displacement preventing portion. More particularly, lateral edges of the vertical plate are inserted from above into the insertion grooves in the rear part of the terminal block to prevent the power supply terminal from being dragged and rotated as the bolt is tightened to fasten the power supply terminal to the power-supply side terminal.

The terminal block may include a mounting hole that is open in an opening surface and accommodates the nut, other mating fastening member with the specific displacement of the mating fastening member prevented. A clearance for allowing a radial movement of the nut may be provided between the inner surface of the mounting hole and the mating fastening member. Thus, even if the insertion hole of the power supply terminal and the nut are misaligned, the bolt is engaged threadedly with the nut while the nut is aligned by radially moving in the mounting hole.

The nut may have a rectangular plan view with flanges projecting from two parallel side surfaces. The terminal block may have a groove projecting radially from the holder with the mounting hole being open at a projecting end side. Facing side walls of the mounting hole may have locks that engage the flanges of the nut. The nut is inserted into the mounting hole through an opening at the projecting end of the terminal block. As a result, the flanges of the nut engage the locks to prevent the nut from detaching from an upper opening of the mounting hole. Thus, the nut can be mounted easily in the terminal block and will not detach.

The power supply terminal may be formed with at least one locking claw to be located in an opening at the projecting end of the mounting hole and engages the nut or other mating fastening member when the power supply terminal is placed on the terminal block. The power supply terminal is placed on the terminal block after the nut is inserted into the mounting hole of the terminal block. The locking claw of the power supply terminal is in the opening at the projecting end of the mounting hole. As a result, the nut is accommodated in the mounting hole and cannot detach.

These and other objects, features and advantages of the present invention will become more apparent upon reading of the following detailed description of preferred embodiments and accompanying drawings.

DETAILED DESCRIPTION OF THE PREFERRED EMBODIMENTS

A motor of this embodiment is a three-phase alternating-current brushless motor with six pairs of poles and is to be installed in a hybrid electric vehicle, such as in a small space between an engine and a transmission. The motor includes a rotor (not shown) coaxially coupled to a horizontal crankshaft of the engine. A ring-shaped stator (not shown) substantially concentrically surrounds the rotor and a central power supply member S substantially concentrically surrounding the stator. The stator has magnetic poles (not shown) formed by winding wires around a core. The magnetic poles are arranged at constant pitches along a circumference concentric with the rotor, and both ends of the winding are drawn out from each magnetic pole.

Figure 1:
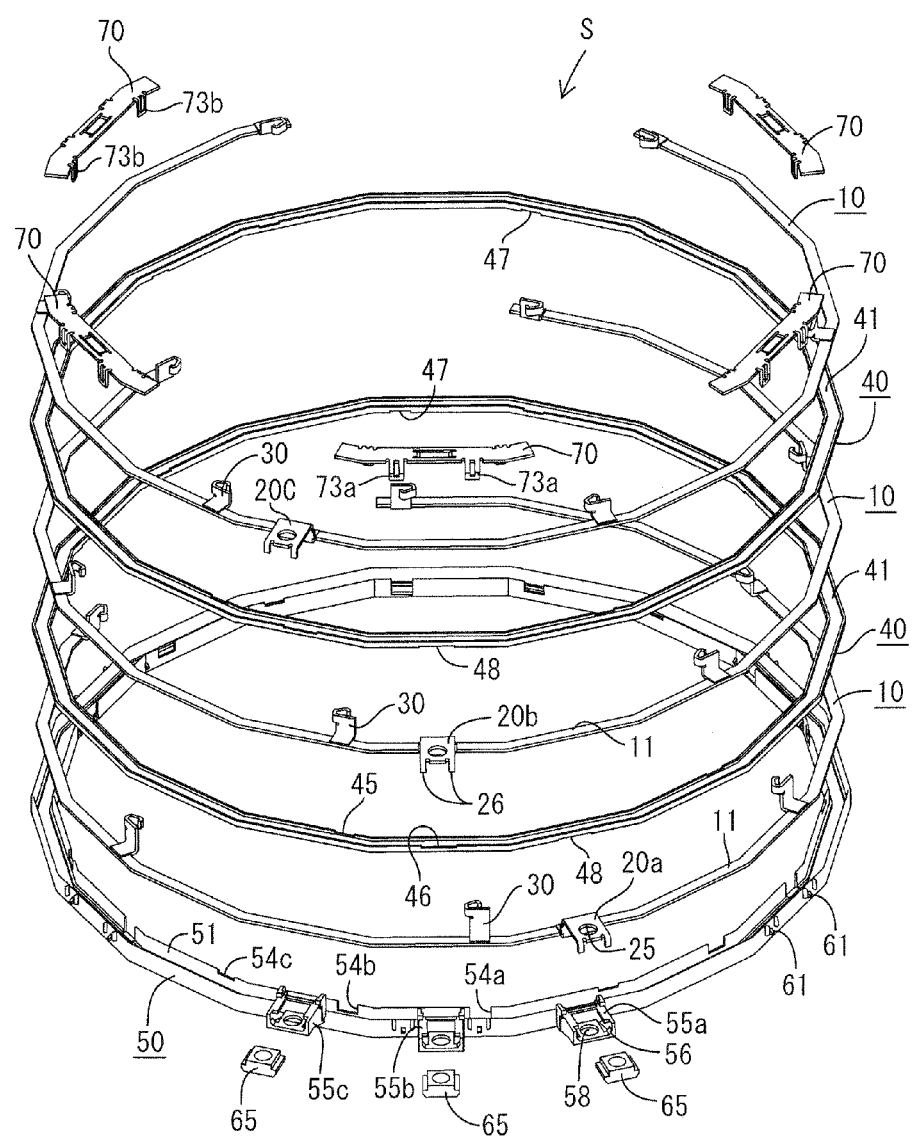
FIG. 1 is an exploded perspective view of a central power supply member according to one embodiment of the present invention.
Figure 2:
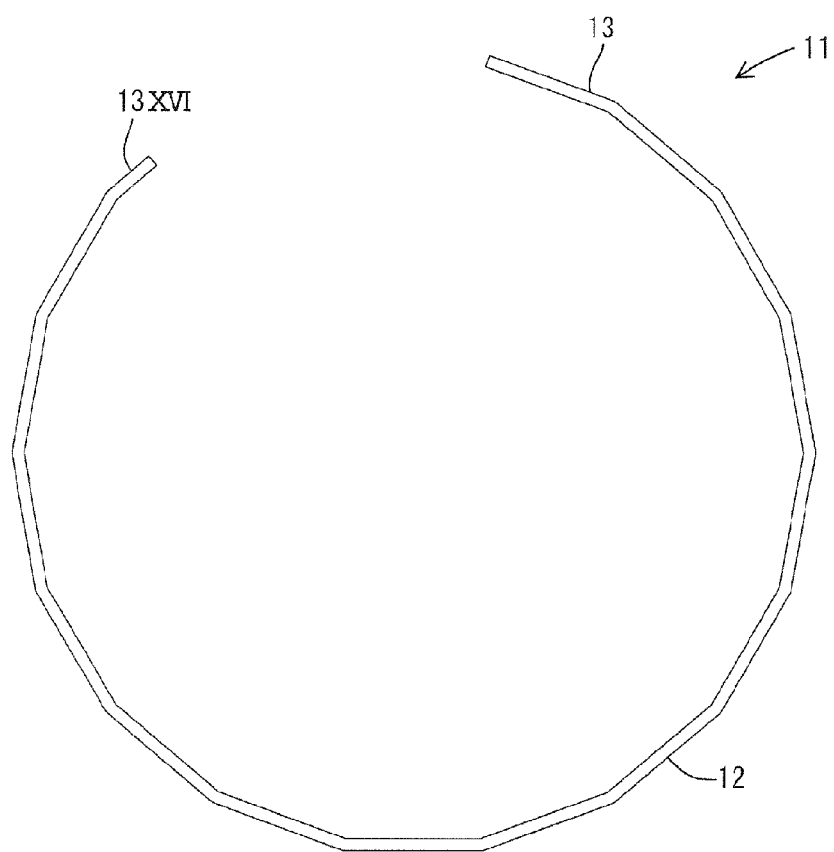
FIG. 2 is a plan view of a busbar main body.

The central power supply member S supplies power to the windings of the stator and, as shown in FIG. 1, includes three busbars 10, two insulating plates 40, a holder 50 for accommodating the busbars 10 and insulating plates 40 and five covers 70 to be mounted on an opening surface of the holder 50. Each busbar 10 includes a power supply terminal 20 and six connecting terminals 30 to the windings.

A busbar main body 11, the power supply terminal 20 and the connecting terminals 30 of the busbar 10 are formed as separate parts in advance. The busbar main body 11 is formed into a right 18-sided ring by bending a strip-like base material 12 of substantially rectangular cross-section at a specified angle (160°) at every specified length in a width direction. However, two of the 18 sides of the right 18-sided shape are cut off or separated and one side at the remaining end is cut or separated to be shorter than a normal length (e.g. about ⅓ of the normal length).

The strip-like base material 12 of the busbar main body 11 is formed by drawing or rolling a conductive metal wire material or cutting a conductive flat metal plate to a specified width. This base material 12 is bent at a specified angle of about 160° while being fed by a specified length each time to form the right 18-sided ring with some of the sides being reduced, as described above. The 18-sided polygonal shape can be formed with greater accuracy, as compared with forming the strip-like base material 12 into a circular ring.

Figure 3:
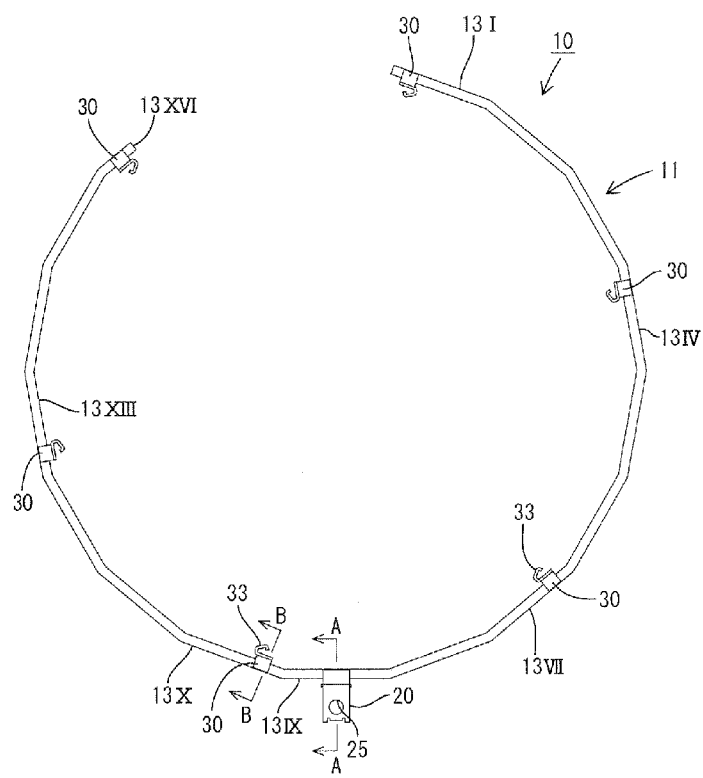
FIG. 3 is a plan view of a busbar.
Figure 4:
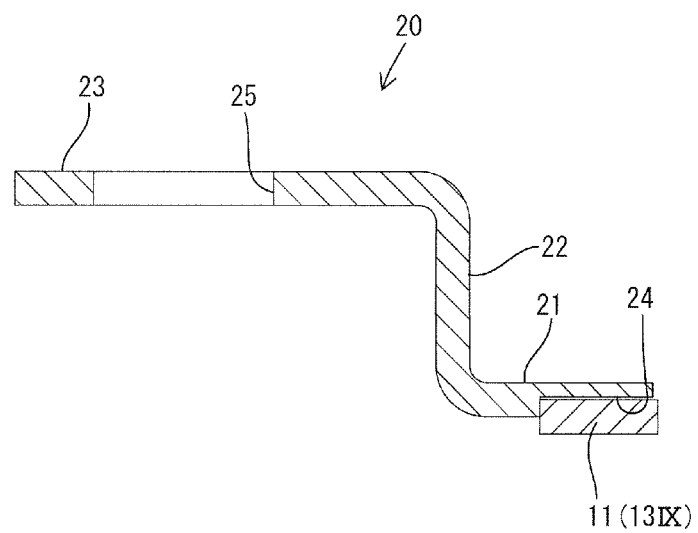
FIG. 4 is a section along A-A of FIG. 3.

A bolt 95 or other such tightening member is used for connecting the power supply terminal 20 to a power-supply side terminal 91 (see FIG. 13), such as an LA terminal, provided on an end of a power supply wire 90 drawn out from the power supply. One power supply terminal 20 is provided for each busbar 10. The power supply terminal 20 is formed by press-working a flat metal plate having substantially the same thickness as the busbar main body 11. The press-working applies punching, bending and the like so that the power supply terminal 20 has a wide and cranked shape when viewed sideways, as shown in FIGS. 3 and 4.

More specifically, the power supply terminal 20 has a mounting plate 21, a bent vertical plate 22 that projects up from the leading end of the mounting plate 21, and a connecting plate 23 bent at a substantially right angle at the upper end of the vertical plate 22. A step-like first joint recessed surface 24 is formed in the lower surface of a base end of the mounting plate 21 and will become a welded part. The first joint recessed surface 24 has a length slightly smaller than the width of the strip-like base material 12 forming the busbar main body 11 and is at a position having a depth that is less than about ⅔ (particularly about half) the thickness of the strip-like base material 12.

Figure 19:
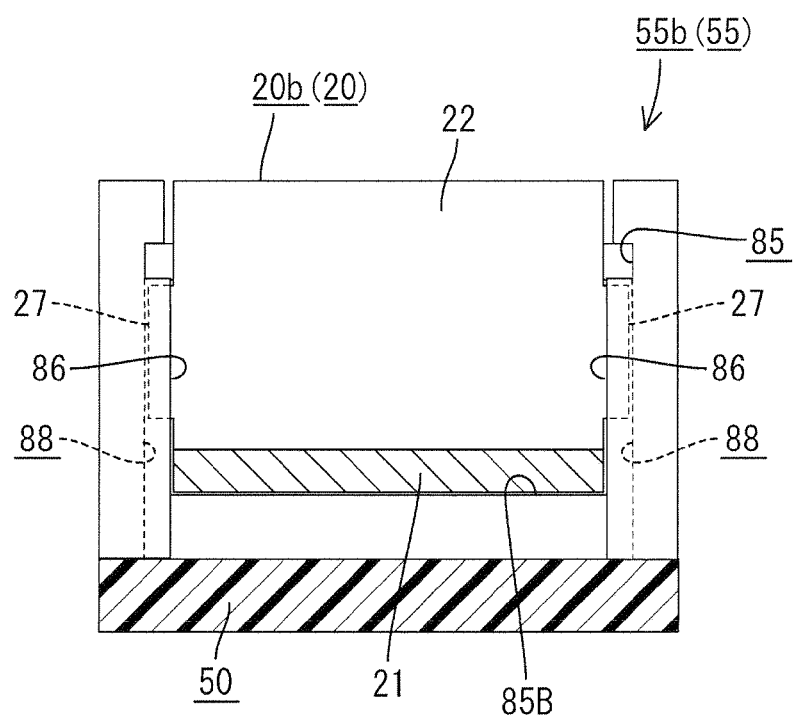
FIG. 19 is a rear view showing a rear part of the terminal block.

As shown in FIG. 19, one or more bulging portions 27 projecting a specified (predetermined or predeterminable) distance are formed at intermediate positions (particularly at substantially central positions) of one or both lateral edges of the vertical plate 22 in a height direction.

Figure 9:
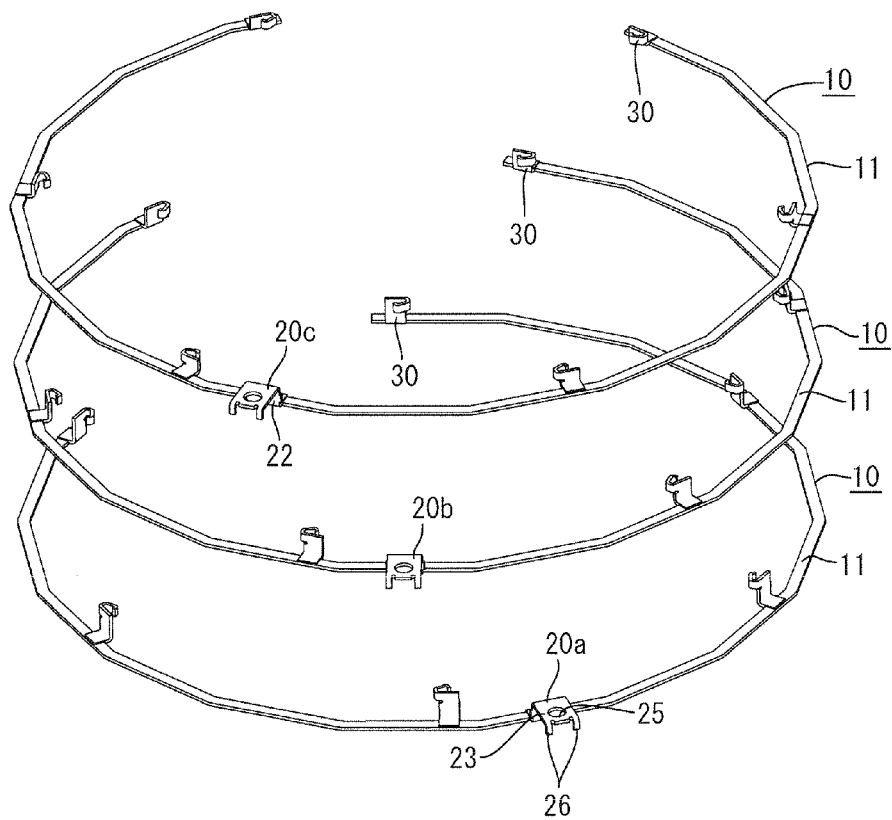
FIG. 9 is a perspective view showing an arrangement structure of three layers of busbars.

The connecting plate 23 is formed with at least one connection hole (particularly bolt insertion hole) 25 and one or more, particularly a pair of locking claws 26, which function to prevent detachment of a mating connection member such as a nut 65 to be described later, are formed to substantially extend downward from (particularly opposite ends of) the leading end edge as shown in FIG. 9.

The connecting terminal 30 particularly is formed by press-working the same conductive (particularly metal) flat plate as the one of which the above power supply terminal 20 is made, thereby applying specified (predetermined or predeterminable) punching, bending, folding, embossing and the like. As also shown in FIGS. 5 to 8, a bent plate (particularly vertical plate) 32 is formed to project or stand up from (particularly the leading end of) a mounting plate 31, and a connecting plate 33 folded or bent to connect an end of the winding is formed at one lateral edge of this bent (vertical) plate 32. A second joint recessed surface 34, which will likewise become a connected (particularly welded) part, is formed in the lower surface of a base end side of the mounting plate 31. The length and depth of this second joint recessed surface 34 particularly are similar or the same as those of the first joint recessed surface 24 of the mounting plate 21 of the above power supply terminal 20.

One power supply terminal 20 and a plurality of (e.g. six) connecting terminals 30 are assembled with the busbar main body 11. Specifically, the power supply terminal 20 is arranged in an intermediate side (specifically in a longitudinal center of the ninth side IX from the start edge) of the busbar main body 11 with the connecting plate 23 faced outward as shown in FIG. 3 and the first joint recessed surface 24 of the mounting plate 21 is to be joined (particularly by resistance welding) in a state fitted on the upper surface of another side (particularly the side 13IX as shown in FIG. 4). Note that, in the following description, each side of the busbar main body 11 is distinguished by attaching a suffix to a reference sign "13" in the case of specifying the position thereof while being denoted by the reference sign "13" when being not distinguished.

Figure 5:
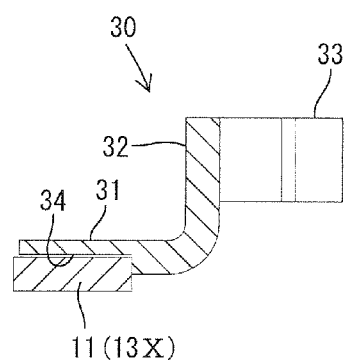
FIG. 5 is a section along B-B of FIG. 3.
Figure 6:
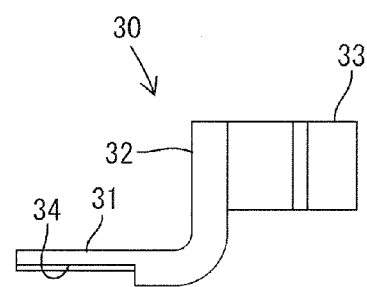
FIG. 6 is a side view of a connecting terminal.
Figure 7:
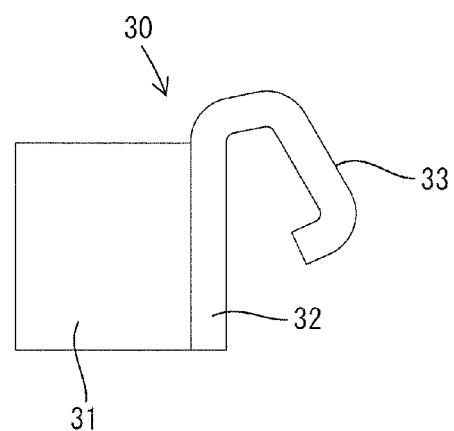
FIG. 7 is a plan view of the connecting terminal.
Figure 8:
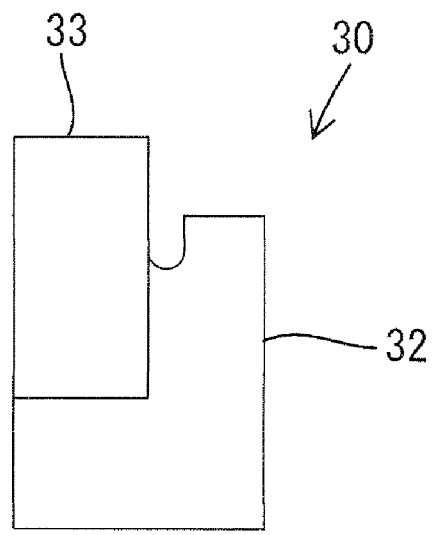
FIG. 8 is a rear view of the connecting terminal.

The connecting terminals 30 are arranged at start edge sides of different, non-adjacent sides (particularly the first, fourth, seventh, tenth and thirteenth sides 13I, 13IV, 13VII, 13X and 13XIII) from the start edge side of the busbar main body 11 and/or on the short side 13XVI at the end edge, i.e. at a plurality of positions, specifically at a total of six positions, with the respective connecting plates 33 faced inward as shown in FIG. 3, and the second joint recessed surfaces 34 of the mounting plates 31 are likewise joined (particularly by resistance welding) in a state fitted on the upper surfaces of these sides 13 as shown in FIG. 5.

There particularly are three busbars 10 having the substantially same shape.

Figure 10:
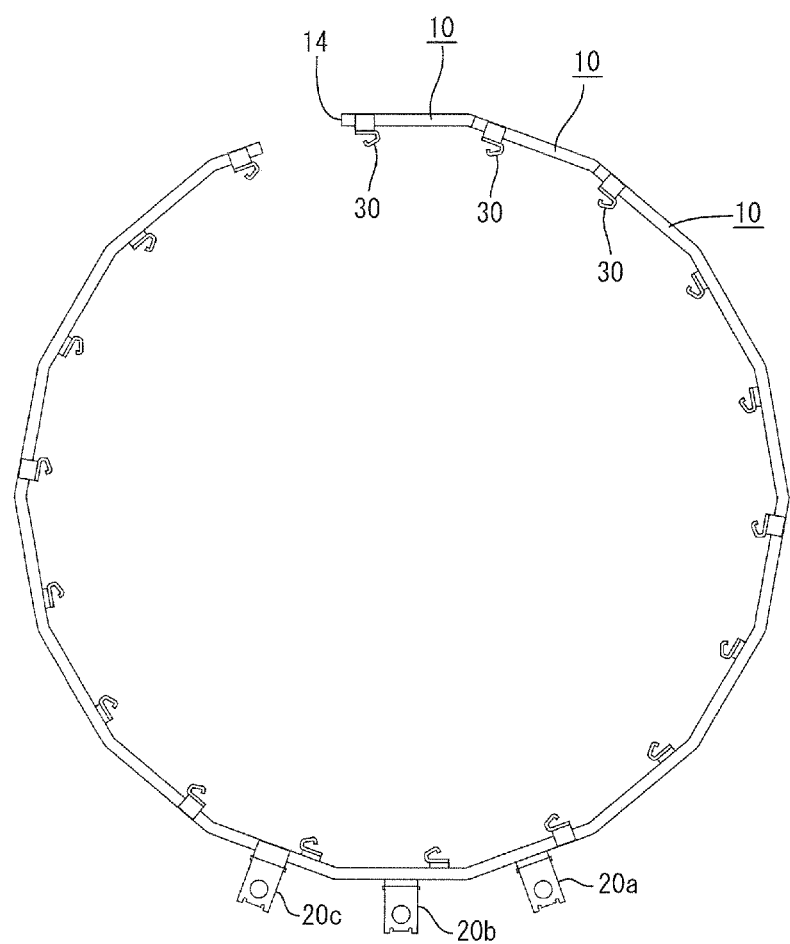
FIG. 10 is a plan view of the arrangement structure.

As described in detailed later, the above (e.g. three) busbars 10 substantially are concentrically arranged one above another with the rotational postures thereof shifted by a specified (predetermined or predeterminable) angle e.g. by 20° (see FIG. 9). In an entire plan view at this time, the (e.g. three) busbars 10 form a right plural-sided (e.g. 18-sided) ring with only a part of one side lacking (lacking part 14). A plurality of (e.g. a total of 18) connecting terminals 30, plural connecting terminals (e.g. six connecting terminals) being provided on each busbar 10, are arranged particularly substantially at equal angular intervals (e.g. of about 20°) on the same circumference as shown in FIG. 10. Further, the power supply terminals 20a to 20c of the respective busbars 10 particularly substantially are arranged at the same angular intervals (e.g. of about 20°) at a side of the ring shape opposite to the lacking part 14 across the center.

Figure 11:
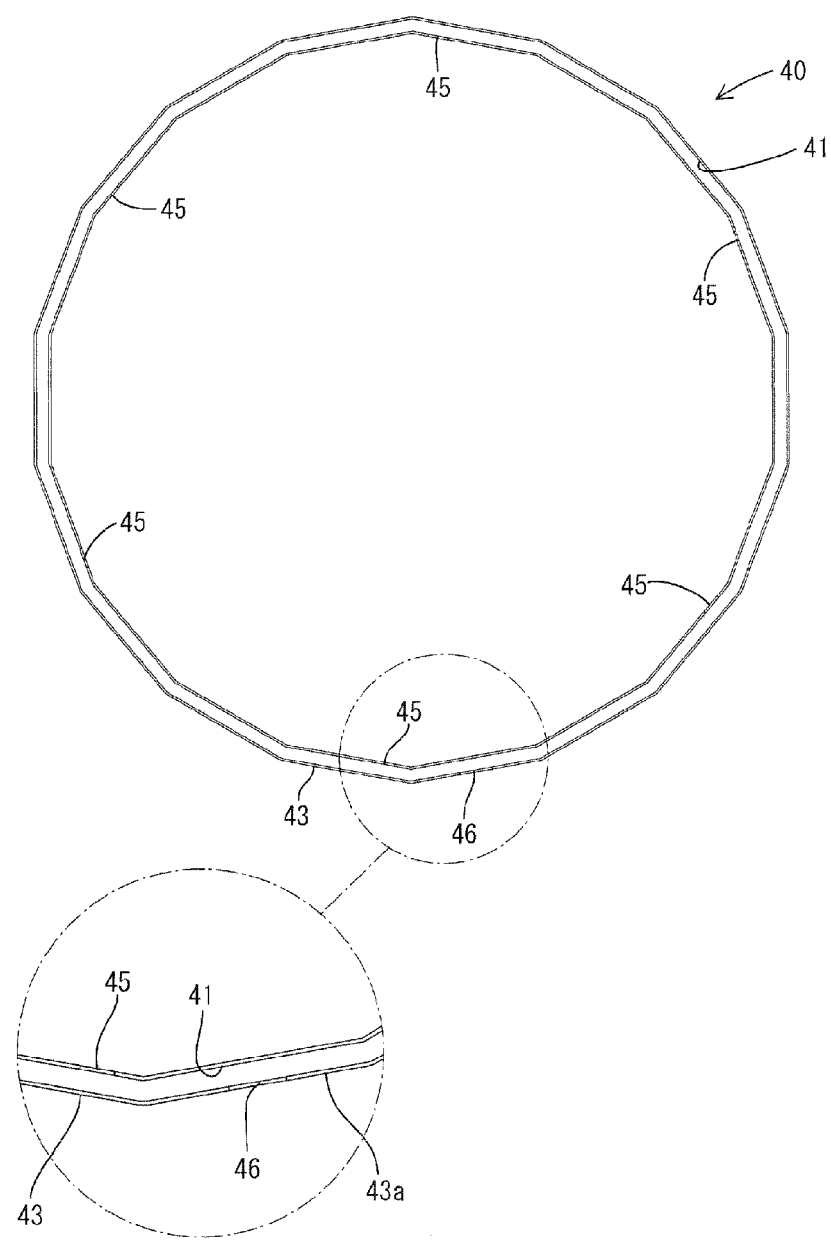
FIG. 11 is a plan view of an insulating plate.

The insulating plates 40 are respectively interposed between the busbars 10 arranged one above another as described above. The insulating plate 40 is made e.g. of synthetic resin and/or particularly substantially formed into a perfect (without any lacking part) right plura-sided (particularly 18-sided) ring having the substantially same diameter as the busbar main body 11 as also shown in FIG. 11. The insulating plate 40 particularly is wider than the busbar main body 11 and/or thicker (particularly about twice as thick) as the busbar main body 11.

At least one fitting groove 41 into which the busbar main body 11 can be substantially tightly fitted so as be flush is formed in a widthwise intermediate part (particularly a widthwise central part) of the upper surface of the insulating plate 40.

As described above, each insulating plate 40 at least partly is interposed between two successive ones of the three busbars 10. As shown in FIGS. 1 and 11, at the upper side of the insulating plate 40, one or more inner escaping grooves 45 into which lower parts (particularly substantially lower halves) of the mounting plates 31 of the connecting terminals 30 are to be fitted and allowed to escape are formed in the inner side wall of the fitting groove 41 at respective sides 43 corresponding to the (e.g. six) connecting terminals 30 joined or connected to the busbar 10 substantially arranged above and an outer escaping groove 46 into which a lower part (particularly a lower half) of the mounting plate 21 of the power supply terminal 20 connected to the busbar 10 arranged above substantially is similarly fitted and allowed to escape is formed in the outer side wall of the fitting groove 43 at one specified (predetermined or predeterminable) side 43a.

Figure 13:
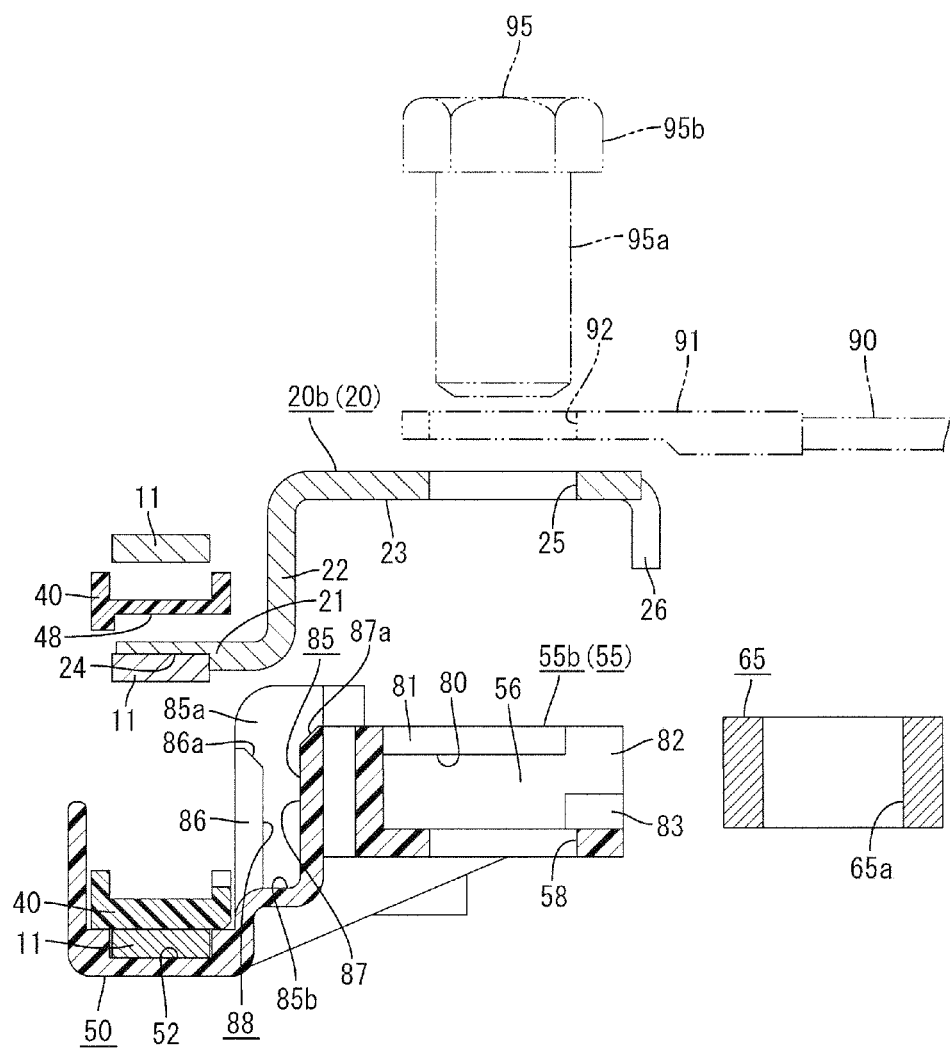
FIG. 13 is an exploded section showing a structure of a part where a power supply terminal is assembled with a terminal block.
Figure 22:
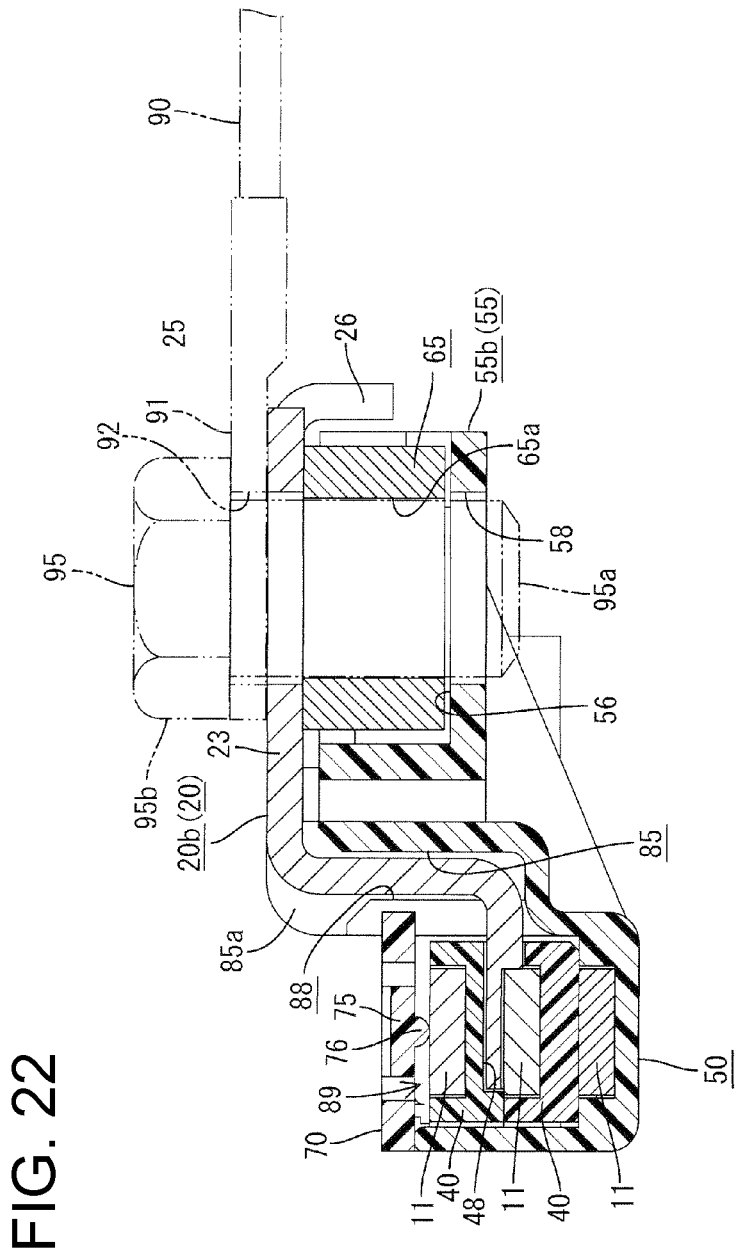
FIG. 22 is a section along D-D of FIG. 20.
Figure 23:
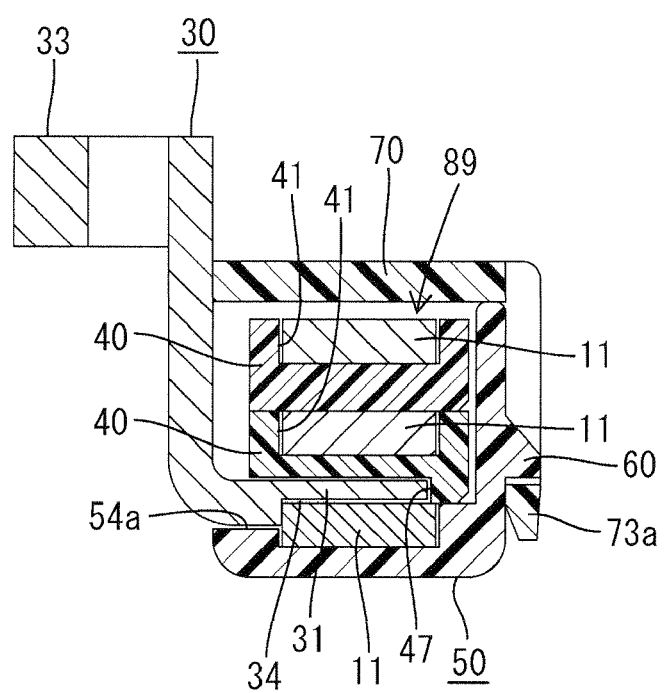
FIG. 23 is a section along E-E of FIG. 20.

Further, at the lower side of the insulating plate 40, one or more inner escaping recesses 47 into which upper parts (particularly upper halves) of the mounting plates 31 of the connecting terminals 30 are to be fitted and allowed to escape are formed at respective sides 43 substantially corresponding to the (e.g. six) connecting terminals 30 joined or connected to the busbar 10 arranged below as shown in FIG. 23 and an outer escaping recess 48 into which an upper part (particularly an upper half) of the mounting plate 21 of the power supply terminal 20 connected to the busbar 10 arranged below substantially is similarly fitted and allowed to escape is formed at one predetermined side 43a as shown in FIGS. 13 and 22.

Figure 12:
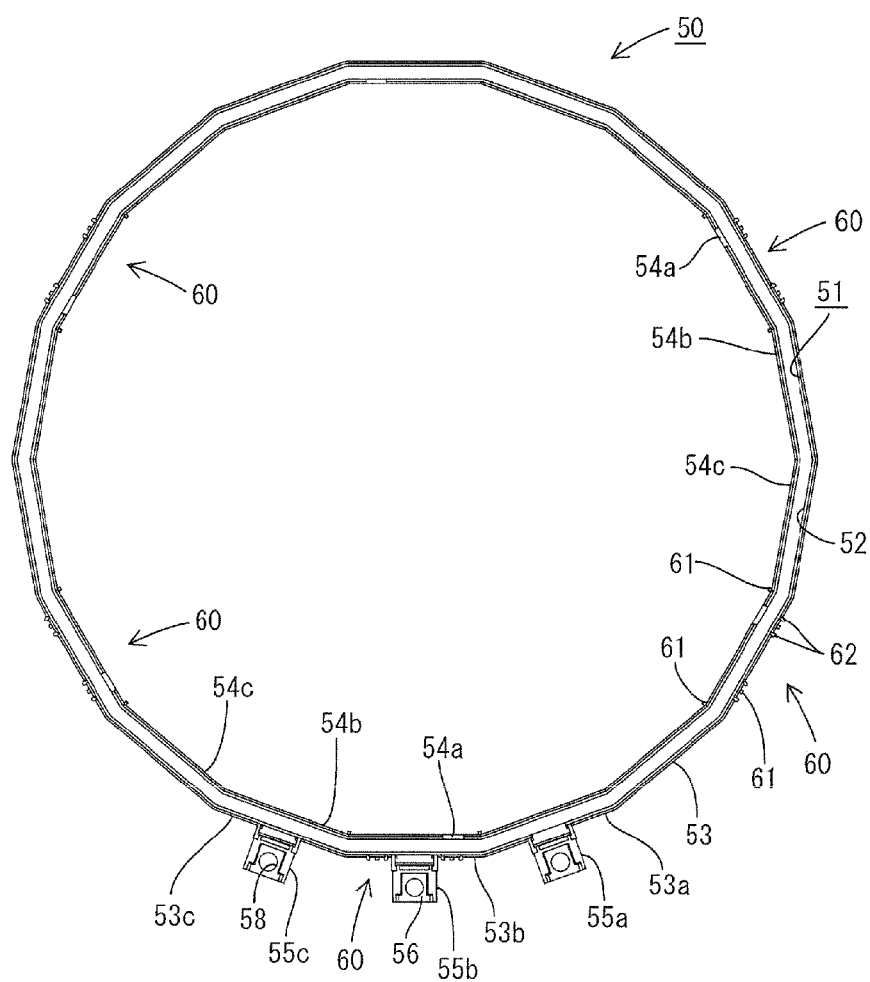
FIG. 12 is a plan view of a holder.

The holder 50 is made e.g. of synthetic resin and formed into a perfect right plural-sided (e.g. 18-sided) ring particularly substantially having the same diameter as the busbar main body 11 as shown in FIG. 12. This holder 50 is formed with a holding groove 51 which is open in the upper surface, and the plural (e.g. three) busbars 10 and the one or more (e.g. two) insulating plates 40 at least partly are to be fitted and held in this holding groove 51 while being alternately arranged or laminated one above another (referred to as a laminated body 89 as appropriate).

At the bottom of the holding groove 51 of the holder 50 is formed at least one fitting groove 52 into which the busbar main body 11 of the busbar 10 of the lowest layer can be substantially tightly fitted particularly so as to substantially be flush as shown in FIG. 13.

Vertical grooves 54a to 54c into which the mounting plates 31 of the connecting terminals 30 provided on the busbars 10 of the respective layers at least partly are to be inserted from above are formed in the inner side wall of the holding groove 51 at specified sides 53 of the holder 50. These (vertical) grooves 54a to 54c particularly are formed to have (e.g. three) different depths so as to conform to respective (e.g. three) height positions of the connecting terminals 30.

One or more terminal mounts 55a to 55c for respectively receiving the respective power feeding terminals 20a to 20c provided on the busbars 10 of the respective layers are formed to project outwardly from the outer surfaces of specified plural (e.g. three) adjacent sides 53a to 53c of the holder 50. The terminal blocks 55a to 55c can receive from the bent (vertical) plates 22 to the connecting plates 23 of the power feeding terminals 20, and are formed to have respective (e.g. three) heights so as to conform to respective (e.g. three) height positions of the power feeding terminals 20. Note that, in the following description, the terminal blocks may be simply denoted by 55 when the respective terminal blocks 55a to 55c are commonly described.

Each terminal block 55 is formed with at least one nut mounting groove 56 (as a particular mating fastening member mounting groove) which is open in the upper surface and the projecting end surface, and the nut 65 is to be at least partly mounted in this nut mounting groove 56 with the displacement (particularly rotation) thereof prevented.

Figure 17:
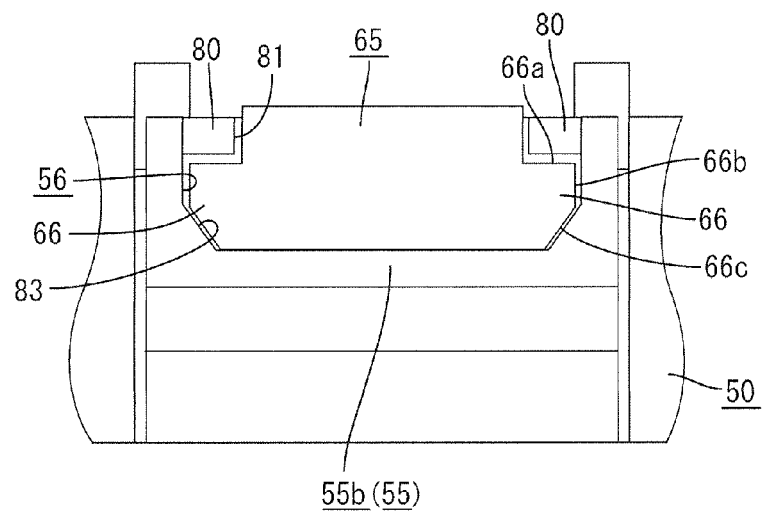
FIG. 17 is a front view showing a nut is mounted in the terminal block.
Figure 18:
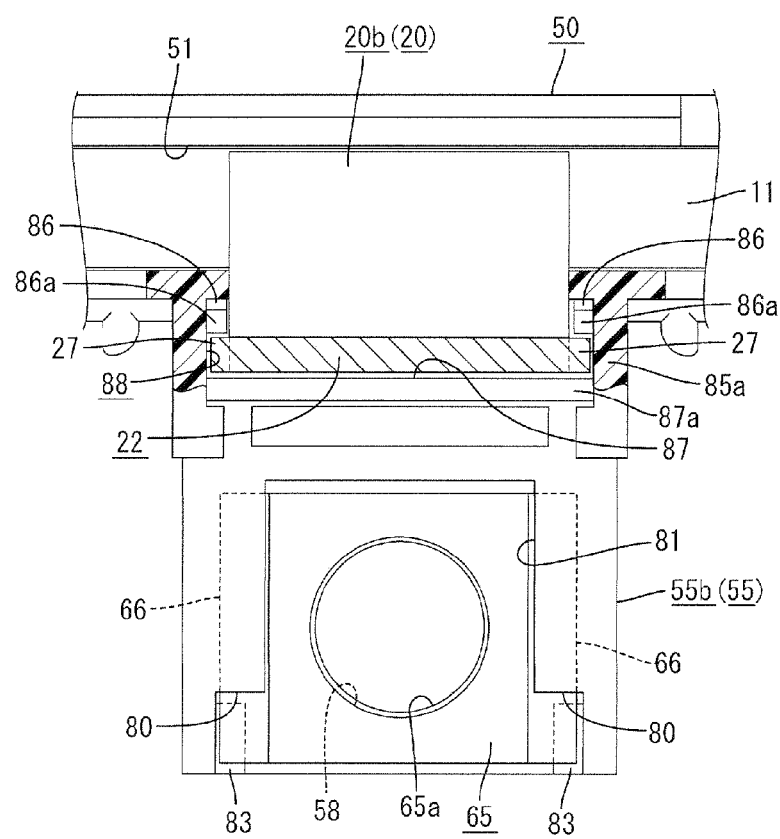
FIG. 18 is a plan view partly in section when a power supply terminal is placed on the terminal block.

The nut 65 has a rectangular or polygonal outer shape as shown in FIGS. 1 and 18, and flanges 66 project over the entire length particularly substantially in substantially lower half areas of left and right side surfaces. As shown in FIG. 17, this flange 66 particularly is formed to have such a front shape that a side surface 66b extends downward at a right angle from the projecting end of a horizontal upper surface 66a and/or a lower end part of the side surface 66b is an inclined surface 66c to gradually narrow the flange 66 toward the bottom.

On the other hand, the nut mounting groove 56 as a whole is formed into a channel having a length longer than the length of the nut 65 in forward and backward directions by a specified dimension, a depth slightly smaller than the thickness of the nut 65 and/or a width larger than a dimension between the side surfaces 66b of the both flanges 66 of the mating fastening member (particularly the nut 65) by a specified dimension. As described later, an escaping hole 58 into which a shaft portion 95a of the fastening member connected to the mating fastening member, particularly of the bolt 95 threadedly engaged with the nut 65, at least partly is to be inserted and allowed to escape is formed at an intermediate position (particularly substantially at a central position) of the bottom of the nut mounting groove 65 in a length direction.

One or more locking portions 80 to be engaged with the upper surfaces 66a of the flanges 66 of the nut 65 are formed to project (particularly substantially toward each other) in areas of upper or distal end parts of the lateral (left and/or right) inner wall surface(s) of the nut mounting groove 56 from respective positions slightly inwardly of the projecting ends to the back surface. An upper or distal opening groove 81 through which an upper or distal end part of the nut 65 can project e.g. upward is formed between the substantially facing surfaces of the both locking portions 80. The width of this upper opening groove 81 particularly is larger than that of the upper end part of the nut 65 by a specified dimension, wherefore the upper end part of the nut 65 at least partly is insertable into the upper opening groove 81 of the nut mounting groove 56 with clearances formed therebetween.

One or more guide portions or projections 83 are formed at or near (particularly lower left and right corners of) an opening (entrance 82) at the projecting end side of the nut mounting groove 56. The facing surfaces of these guide portions or projections 83 are surfaces inclined at an angle substantially in conformity with the inclined surfaces 66c of the flanges 66 of the nut 65. A part of the nut 65 between the inclined surfaces 66c of the flanges 66 at least partly is insertable between the facing surfaces of the both guide projections 83 with clearances formed therebetween.

In other words, the nut 65 is corrected into an appropriate posture (particularly an upright posture) by passing between (or being guided by) the (both) guide projection(s) 83 and at least partly insertable into the nut mounting groove 56 through the entrance 82 by at least partly inserting the lateral (left and/or right) flange(s) 66 below the locking portion(s) 80 and/or at least partly inserting the upper end part into the upper opening groove 82. After insertion, the lateral (left and/or right) flange(s) 66 are engaged with the locking portion(s) 80, thereby preventing (particularly substantially outward or upward) detachment of the nut 65 from the nut mounting groove 56. Note that clearances particularly are secured between the side surfaces 66b of the both flanges 66 and the inner surfaces of the nut mounting groove 56 (including the inner surfaces of the guide projections 83) and the nut 65 at least partly is accommodated in the nut mounting groove 56 movably in the width direction and/or the length direction since the width of the upper opening groove 81 is wider than the lateral width of the upper end part of the nut 65.

As partly already described, the bent (vertical) plate 22 of the power feeding terminal 20 is to be arranged substantially along the rear surface of the terminal block 55.

As shown in FIG. 13, a mounting recess 85 into which the bent (vertical) plate 22 of the power feeding terminal 20 at least partly is insertable from above is formed in the rear surface of the terminal block 55 to be open backward (left-ward in FIG. 13). Specifically, as also shown in FIG. 18, the mounting recess 85 is formed such that a distance between lateral (left and right) side walls 85a particularly substantially is equivalent to a dimension between the projecting ends of the bulging portions 27 formed on the opposite lateral edges of the bent (vertical) plate 22 of the power feeding terminal 20, and/or includes a bottom wall 85b capable of at least partly receiving a connected part of the lower end of the bent (vertical) plate 22 and the mounting plate 21.

At opening end sides of the lateral (left and right) side walls 85a, one or more (particularly substantially rectangular) column portions 86 are formed to stand up from the bottom wall 85b to positions slightly below the upper edges. The (rectangular) column portions 86 and a back wall 87 are spaced apart by a distance equivalent to the thickness of the bent (vertical) plate 22, thereby forming one or more insertion grooves 88, into which the bulging portions 27 of the bent (vertical) plate 22 at least partly are to be inserted to be locked, between the both (rectangular) column portions 86 and the back wall 87.

Note that inclined guiding surfaces 86a, 87a are respectively formed on the upper ends of the both (rectangular) columns 86 and the upper end of the back wall 87 in the mounting recess 85.

Figure 20:
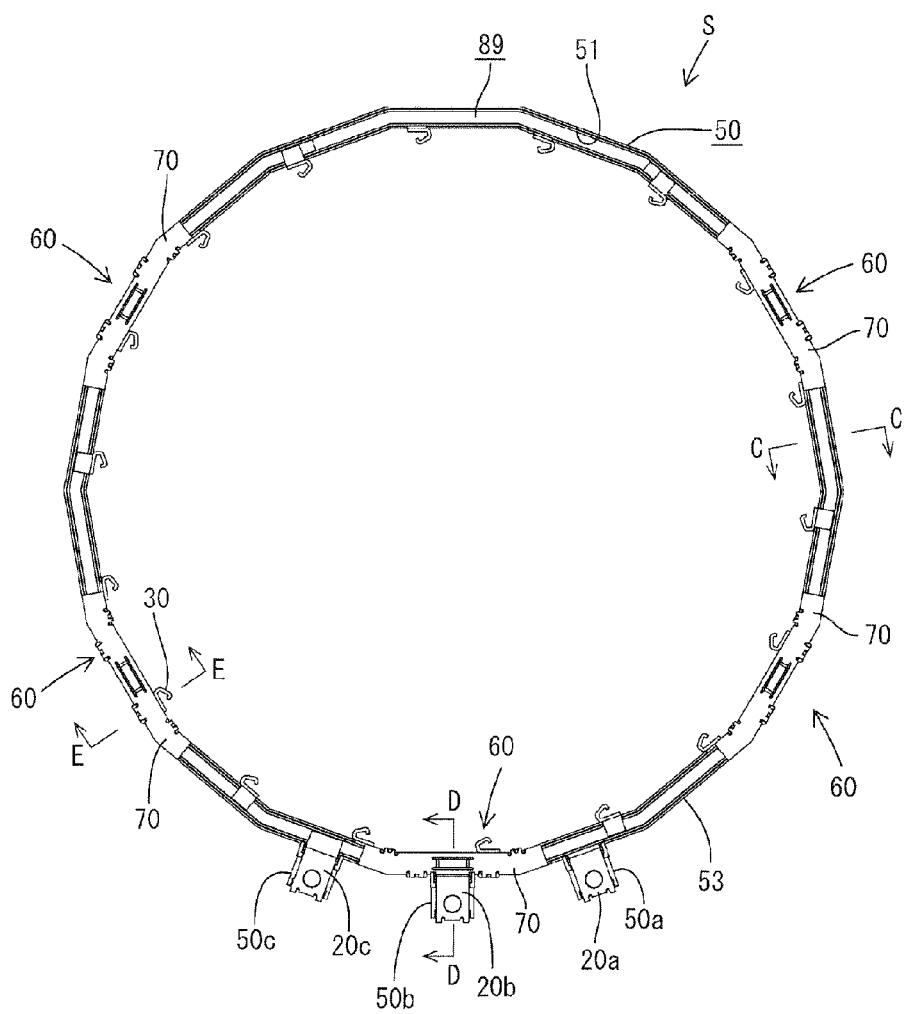
FIG. 20 is a plan view showing a completely assembled state of the central power supply member.

Covers 70 are mounted to at least partly cover the upper opening of the holder 50. As shown in FIGS. 12 and 20, the covers 70 specifically are mounted on the side 53 formed with the central terminal block 55b and/or every third side 53 from the former side 53 at each side, i.e. at a total of five positions (mounted positions 60).

Figure 14:
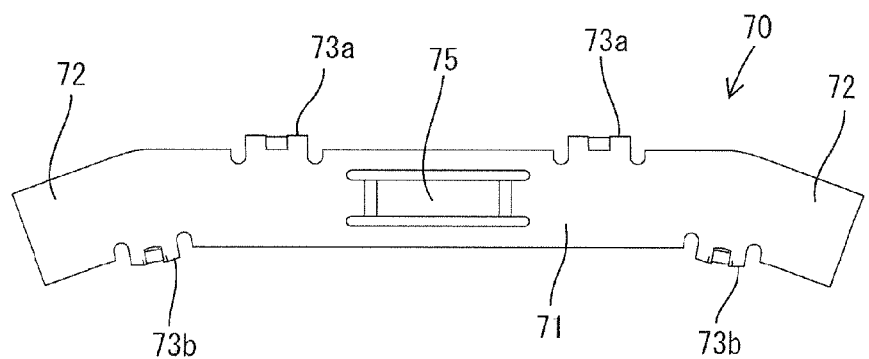
FIG. 14 is a plan view of a cover.
Figure 15:
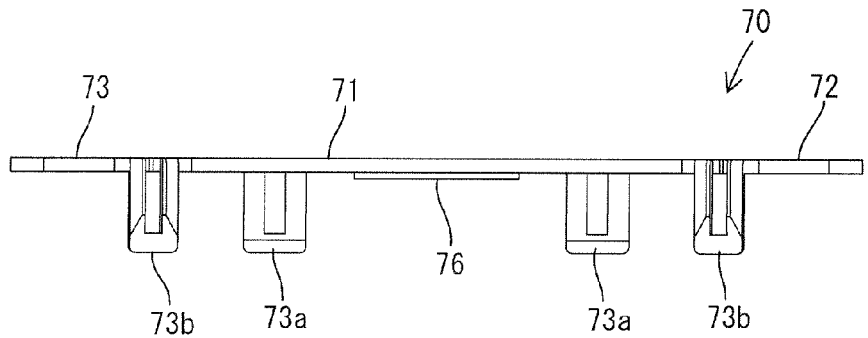
FIG. 15 is a front view of the cover.
Figure 16:
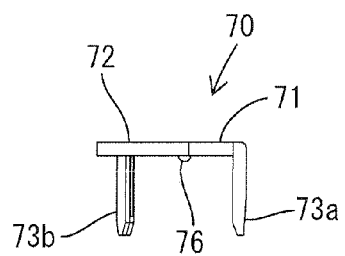
FIG. 16 is a side view of the cover.

The cover 70 is made e.g. of synthetic resin and so shaped that short bent portions 72 are provided on both ends of a straight portion 71 to at least partly cover one side 53 of the holder 50 and parts of both neighboring sides 53 as shown in FIGS. 14 to 16.

Each cover 70 is formed with one or more resiliently displaceable lock frame pieces 73, specifically with a total of four resiliently displaceable lock frame pieces 73, two on the outer edge and two on the inner edge, extending downward. The two lock frame pieces 73a on the outer edge are formed at positions near the both ends of the straight portion 71 and the two lock frame pieces 73b on the inner side are formed at linking parts of the straight portion 71 and the bent portions 72.

On the other hand, one or more lock projections 61, specifically a total of four lock projections 61, two on the outer side and two on the inner side, which are fitted into the respective lock frame pieces 73a, 73b to be locked are formed at the (particularly each) mounting position 60 of the cover 70 in the holder 50. The two lock projections 61 on the outer side are formed at positions near both ends of one side 53 and the two lock projections 61 on the inner side are formed at bent linking parts between the one side 53 and the both neighboring sides 53.

Since the lock frame pieces 73b on the inner edge at least partly are to be inserted into valley parts particularly having an obtuse angle in a plan view such as the linking parts of one side 53 and the both neighboring sides 53 in the holder 50, the inner surfaces of the lock frame pieces 73b on the inner edge are formed to have a mountain shape in conformity with the above valley shape.

Further, one or more guides 62 for substantially guiding the insertion of the lock frame piece 73a are formed at one or both sides of the lock projection 61 on the outer side.

At least one pressing plate 75 for resiliently pressing the upper surface of the laminated body 89 at least partly fitted into the holding groove 51 of the holder 50 is formed in an intermediate part (particularly substantially in a central part)

of the straight portion 71 of the cover 70 in a longitudinal direction. The pressing plate 75 particularly substantially is shaped to be long and narrow along the longitudinal direction of the straight portion 71 and/or formed to be supported at both ends particularly by cutting, whereby the central part in the longitudinal direction is resiliently deformable in a vertical direction, and one or more pressing protrusions 76 are formed substantially along the width direction on the lower surface of the central part of the straight portion 71.

Next, an example of an assembling procedure of the central power supply member S according to this embodiment is described.

As describe above, for the busbar 10, one power supply terminal 20 is arranged in an outward facing posture and (e.g. six) connecting terminals 30 are arranged in an inward facing posture at specified (predetermined or predeterminable) positions of the busbar main body 11 formed into a plural-sided ring (particularly a right 18-sided ring) with a lacking part and joined or connected particularly by resistance welding. The busbar main body 11 particularly substantially has a rectangular cross-section, the first joint recessed surface 24 of the mounting plate 21 of the power supply terminal 20 and the second joint recessed surfaces 34 of the mounting plates 31 of the connecting terminals 30 particularly substantially are entirely in contact with the flat upper surface of the busbar main body 11, i.e. can be joined with large contact areas secured, particularly whereby welding joint is possible with the postures determined with high accuracy.

In assembling, the plural (e.g. three) busbars 10, the one or more (e.g. two) insulating plates 40, the holder 50 and the respective (e.g. five) covers 70 as described above are prepared.

First, the holder 50 is placed on an assembling table and one or more (e.g. three) terminal blocks 55a to 55c are placed in a forward facing posture, for example, as shown in FIG. 1. As shown in FIGS. 13 and 17, the nut 65 (as a particular mating fastening member) at least partly is inserted into the nut mounting groove of each terminal block 55a to 55c particularly by at least partly inserting the lateral (left and right) flange(s) 66 below the locking portion(s) 80. The nut 65 is mounted in the nut mounting groove 56 with the displacement (e.g. rotation) thereof prevented, and the lateral (left and/or right) flange(s) 66 is/are engaged with the locking portion(s) 80, thereby preventing detachment of the nut 65 through the upper opening groove 81 of the nut mounting groove 56. However, the nut 65 particularly is at least partly accommodated in the nut mounting groove 56 movably in forward and backward directions and/or lateral direction.

In this state, the busbar 10 to be located in the lowest one of the plural (e.g. three) layers at least partly is inserted into the holding groove 51 of the holder 50 particularly in a specified (predetermined or predeterminable) relative posture (particularly rotational posture), i.e. such a (rotational) posture that the power supply terminal 20a provided on this busbar 10 is located right above the rightmost terminal block 55a of the holder 50 shown in FIG. 1 when viewed from front.

The (e.g. six) inward facing connecting terminals 30 of this busbar 10 are at least partly inserted into the respective vertical groove(s) 54a particularly having a largest depth and/or allowed to escape and the busbar main body 11 at least partly is fitted into the fitting groove 42 on the bottom of the holding groove 51 particularly substantially so as to be flush.

Simultaneously, the connecting plate 23 of the power supply terminal 20a provided on this busbar 10 to face outward is placed on the rightmost terminal block 55a. As shown in FIG. 13 for reference purpose, the bent (vertical) plate 22 of the power supply terminal 20a is pushed along the back wall 87 of the mounting recess 85 while the lateral (left and/or right) bulging portion(s) 27 at least partly is/are inserted into the corresponding insertion groove(s) 88. At this time, the bulging portion(s) 27 of the bent (vertical) plate 22 is/are smoothly inserted into the insertion groove(s) 88 by being guided by the guiding surface(s) 86a, 87a.

After being pushed or displaced by a specified amount, the connecting plate 23 is placed on the upper surface of the nut 65 mounted into the nut mounting groove 56 and slightly projecting from the upper opening groove 81 and the bolt insertion hole 25 of the connecting plate 23 particularly is substantially aligned with an external thread 65a of the nut 65. At this time, the locking claws 26 at the leading end of the connecting plate 23 close both lateral (left and/or right) side(s) of the entrance 82 of the nut mounting groove 56, thereby preventing detachment of the nut 65 through the entrance 82.

Figure 21:
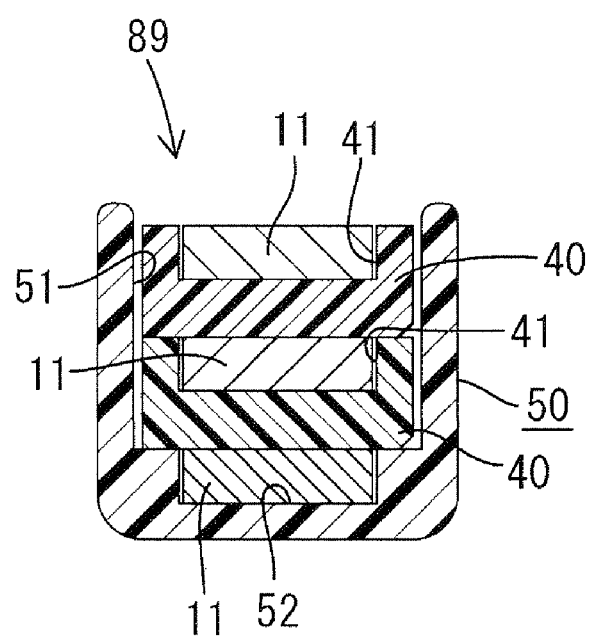
FIG. 21 is a section along C-C of FIG. 20.

Subsequently, the lower insulating plate 40 at least partly is inserted in a specified relative posture (particularly rotational posture), i.e. in such a (rotational) posture that the outer escaping recess 48 formed in the lower surface of the insulating plate 40 substantially is located right above the power supply terminal 20a of the busbar 10 inserted before. This insulating plate 40 is placed with the lower surface thereof held in close contact with the bottom of the holding groove 51 as shown in FIGS. 21 to 23 while the mounting plate 21 at least partly is fitted into the outer escaping recess 48 in the lower surface and/or allowed to escape and the mounting plates 31 of the corresponding connecting terminal(s) 30 at least partly is/are fitted into the respective (e.g. six) inner escaping recesses 47 similarly formed in the lower surface and allowed to escape.

Subsequently, the busbar 10 of the intermediate layer at least partly is inserted in a specified relative posture (particularly rotational posture), i.e. such a rotational posture that the power supply terminal 20b provided on this busbar 10 substantially is located right above the central terminal block 55b of the holder 50 shown in FIG. 1.

The (e.g. six) inward facing connecting terminal(s) 30 of this busbar 10 at least partly is/are inserted into the vertical groove(s) 54b having an intermediate depth and/or allowed to escape and the busbar main body 11 at least partly is fitted into the fitting groove 41 formed in the upper surface of the inserted insulating plate 41 inserted below particularly substantially so as to be flush and, in addition, the connecting plate 23 of the power supply terminal 20b particularly is placed on the central terminal block 55b as shown in FIG. 13.

The bent (vertical) plate 22 of the power supply terminal 20a is similarly pushed along the back wall 87 of the mounting recess 85 while the lateral (left and/or right) bulging portion(s) 27 at least partly is/are inserted into the corresponding insertion groove(s) 88, the connecting plate 23 is placed on the projecting upper surface of the nut 65 mounted in the nut mounting groove 56, and/or the bolt insertion hole 25 particularly is substantially aligned with an external thread 65a of the nut 65. In addition, the locking claw(s) 26 at the leading end of the connecting plate 23 close(s) the (particularly both) lateral (left and/or right) side(s) of the entrance 82 of the nut mounting groove 56, thereby preventing detachment of the nut 65.

Subsequently, similarly to the lower insulating plate 40, the upper insulating plate 40 at least partly is inserted in such a relative posture (particularly rotational posture) that the outer escaping recess 48 formed in the lower surface substantially is located right above the power supply terminal 20b of the inserted busbar 10 of the intermediate or previous layer. This insulating plate 40 is placed with the lower surface thereof held in close contact with the upper surface of the lower insulating plate 40 with the busbar main body 11 located therebetween as shown in FIGS. 21 to 23 while the mounting plate 21 of the power supply terminal 20b at least partly is fitted into the outer escaping recess 48 in the lower surface and/or allowed to escape and/or the mounting plate(s) 31 of the corresponding connecting terminals 30 at least partly is/are fitted into the respective (e.g. six) inner escaping recesses 47 and allowed to escape.

Thereafter, the busbar 10 of the upper layer is inserted in such a relative (particularly rotational) posture that the power supply terminal 20c provided on this busbar 10 substantially is located right above the central terminal block 55c of the holder 50 shown in FIG. 1.

The (e.g. six) inward facing connecting terminal(s) 30 of this busbar 10 at least partly is/are inserted into the vertical groove(s) 54c having a smallest depth and/or allowed to escape and the busbar main body 11 at least partly is fitted into the fitting groove 41 of the insulating plate 40 inserted below particularly substantially so as to be flush and, in addition, the connecting plate 23 of the power supply terminal 20c particularly is placed on the central terminal block 55c.

The bent (vertical) plate 22 of the power supply terminal 20c is also similarly pushed along the back wall 87 of the mounting recess 85 while the lateral (left and/or right) bulging portion(s) 27 at least partly is/are inserted into the corresponding insertion groove(s) 88, the connecting plate 23 at least partly is placed on the projecting upper surface of the nut 65 mounted in the nut mounting groove 56, and/or the bolt insertion hole 25 particularly is substantially aligned with an external thread 65a of the nut 65. In addition, detachment of the nut 65 particularly is prevented by the locking claws 26 at the leading end of the connecting plate 23.

In the above manner, the laminated or layered body 89 is formed in which the three busbars 10, the two insulating plates 40 are alternately laminated or arranged, and this laminated or layered body 89 is to be at least partly accommodated in the holding groove 51 of the holder 50.

Finally, the one or more covers 70 are respectively mounted on the specified one or more (e.g. five) mounted positions 60 of the upper opening of the holder 50. Each cover 70 particularly is pushed while the inner and outer lock frame pieces 73 are brought into contact with the corresponding lock projections 61 to be resiliently displaced. When the cover 70 substantially comes into contact with the upper ends of the lateral edges of the holding groove 51, the lock frame pieces 73 at least partly return to be fitted to the lock projections 61, whereby the cover 70 and retained and mounted. In addition, the pressing protrusion(s) 76 provided on the pressing plate 75 of the (particularly each) cover 70 resiliently press(es) the upper surface of the laminated body 89 and the laminated body 89 particularly is pressed against the bottom of the holding groove 51. As a result, the laminated body 89 is accommodated while being firmly held in the holding groove 51.

In this way, the assembling of the central power supply member S is completed.

The central power supply member S assembled as described above is to be arranged substantially around the stator of the brushless motor, one end of the corresponding winding provided in the stator is connected to the connecting plate 33 of each of plurality of (e.g. eighteen) connecting plates 30 provided on the inner peripheral side of the central power supply member S particularly by fusing or the like. Note that the other end of each winding is connected to a common conductive member for each phase.

On the other hand, the power-supply side terminals 91 provided at ends of the corresponding power supply wires 90 are placed on the plural (e.g. three) terminal blocks 55a to 55c collectively provided on the outer peripheral side of the central power supply member S and fixed by the fastening members, particularly the bolts 95.

This is described, taking the central terminal block 55b as an example. As shown in FIG. 22, the connecting plate 23 of the power supply terminal 20b is placed on the terminal block 55b, actually on the upper surface of the nut 65 at least partly accommodated in the nut mounting groove 56 of the terminal block 55b, and the corresponding power-supply side terminal 91 is placed on this connecting plate 23 with the bolt insertion bolts 25, 92 aligned with each other.

Subsequently, the bolt 95 specifically is inserted through the bolt insertion holes 25, 92 of the both terminals 20b, 91 placed one over the other, and threadably engaged with the nut 65. At this time, even if the bolt insertion holes 25, 92 of the power supply terminal 20b and the power-supply side terminal 91 are misaligned from the external thread 65a of the nut 65, the bolt 95 is or can be threadably engaged while the nut 65 substantially is aligned particularly by moving in forward and backward directions and/or lateral direction in the nut mounting groove 56.

Thereafter, when the bolt 95 is turned in a tightening direction e.g. using a tool or the like, it is smoothly tightened since the displacement (particularly rotation) of the nut 65 is prevented and the connecting plate 23 of the power supply terminal 20b and the mating power-supply side terminal 91 are sandwiched between a head portion 95b of the bolt 95 and the nut 65, with the result that the power supply terminal 20b and the mating power-supply side terminal 91 are electrically connected.

The power supply terminal 20b may be possibly dragged and rotated by frictional engagement during the above tightening operation of the bolt 95, but the bulging portions 27 formed on the both lateral edges of the bent (vertical) plate 22 of this power supply terminal 20b particularly are substantially tightly inserted into the insertion grooves 88 in the width direction, thereby preventing this bent (vertical) plate 22 from moving in the width direction, i.e. preventing this power supply terminal 20 from being dragged and rotated.

This can prevent fracture of the welded part of the mounting plate 21 of this power supply terminal 20b to the busbar main body 11 due to application of a load thereto.

Since the other power supply terminals 20a, 20c particularly are similarly placed on the corresponding terminal blocks 55a, 55c, the mating power-supply side terminals 91 are respectively placed thereon and then the bolt(s) 95 at least partly is/are inserted through the terminal(s) and threadably engaged with and screwed into the nut(s) 65 mounted in the terminal block(s) 55a, 55c, whereby the respective power supply terminal(s) 20a, 20c and the mating power-supply side terminal(s) 91 can be connected. Further, the power supply terminals 20a, 20b particularly are similarly prevented from being dragged and rotated.

As described above, in this embodiment, the holder 50 for at least partly accommodating the busbars 10 is provided with the one or more terminal blocks 55 in which the one or more nuts 65 as particular mating fastening members are to be mounted with the displacement (particularly rotation) thereof at least partly prevented, and the one or more power supply terminals 20 provided on the respective busbar(s) 10 are assembled by placing the one or more connecting plates 23 on the upper surface(s) of the terminal block(s) 55 while the bent (vertical) plate(s) 22 is/are placed substantially along the rear surface(s) of the terminal block(s) 55. Thus, in connecting the power supply terminal 20 to the mating power-supply side terminal 91, it is sufficient to at least partly insert the bolt 95 through the both terminals 20, 91 and screw it into the nut 65 after the power-supply side terminal 91 is placed on the power supply terminal 20 placed on the terminal block 55. Therefore, a connecting operation can be easily performed.

A structure for placing the power supply terminal 20 on the terminal block 55 includes the bulges 27 on both lateral edges of the bent (vertical) plate 22, whereas the insertion grooves 88 into which the bulges 27 are fit tightly in the width direction are formed in the rear surface of the terminal block 55, thereby forming a rotation preventing portion for preventing a movement of the bent (vertical) plate 22 in the width direction. Thus, if the power supply terminal 20 tries e.g. to rotate due to frictional engagement as the bolt 95 is tightened, the power supply terminal 20 is prevented from being dragged and rotated by the rotation preventing portion. This can prevent fracture of the welded part due to application of a load to the welded part of the mounting plate 21 of this power supply terminal 20 to the busbar main body 11.

As described above, the holder 50 for accommodating the busbars 10 includes the terminal blocks 55 in which the nuts 65 are mounted with the displacement prevented, and the power supply terminals 20a to 20c provided on the respective busbars 10 are to be assembled by being at least partly placed on the corresponding terminal blocks 55a to 55c. Thus, in connecting the power supply terminal 20 to the mating power-supply side terminal 91, it is sufficient to insert the bolt 95 through the terminals 20, 91 and screw it into the nut 65 after the power-supply side terminal 91 is placed on the power supply terminal 20 placed on the terminal block 55. Therefore, a connecting operation can be easily performed.

The nut 65 particularly is mounted in the nut mounting groove 56 provided in the terminal block 55 with the rotation thereof prevented, and inserted with the clearances formed between the nut 65 and the peripheral wall so as to be movable in forward and backward directions and/or lateral direction, but restricted in its rotational displacement. Thus, even if the bolt insertion hole 25 of the connecting plate 23 of the power supply terminal 20 and the nut 65 happen to be misaligned, the bolt 95 can be threadably engaged with the nut 65 while the nut 65 substantially is aligned by moving in forward and backward directions and/or lateral direction in the nut mounting groove 56. Thus, a successive operation of tightening the bolt 95 can be accurately and efficiently performed.

The nut mounting groove 56 provided in the terminal block 55 particularly is formed such that the entrance 82 is open in the projecting end surface and the nut 65 at least partly is inserted into the nut mounting groove 56 through the entrance 82. At that time, the flanges 66 formed on the left and right surfaces of the nut 65 are fit below and engaged with the one or more locking portions 80 formed on the side walls, thereby preventing upward detachment of the nut 65 from the nut mounting groove 56. The nut 65 can be easily mounted on the terminal block 55 with detachment thereof prevented.

The locking claws 26 are provided at the leading end of the connecting plate 23 of the power supply terminal 20, and these locking claws 26 are at the entrance 82 of the nut mounting groove 56 and engaged with the nut 65 when this connecting plate 23 is placed on the terminal block 55. Detachment of the nut 65 through the entrance 82 of the nut mounting groove 56 can be hindered even without providing the terminal block 55 with a particular part.

Furthermore, to simplify an operation of connecting a power-supply side terminal to a power supply terminal, in a central power supply member S for supplying power to windings of a stator of a motor, a plurality of ring-shaped busbars 10 each including a power supply terminal 20 and connecting terminals 30 to the windings are laminated and accommodated in a holder 50 made of synthetic resin while being insulated from each other and power-supply side terminals 91 drawn out from a power supply are individually connected to the power supply terminals 20 of the respective busbars 10. The power supply terminals 20 and the power-supply side terminals 91 are in the form of plates including insertion holes 25, 92 for a bolt 95 and placed one over another. The holder 50 includes terminal blocks 55 on which the power supply terminals 20 are to be placed, and a nut 65 to be threadedly engaged with the bolt 95 is mounted in each terminal block with the rotation thereof prevented.

The invention is not limited to the above described embodiment. For example, the following embodiments also are included in the scope of the invention.

The invention can also be applied in the case where a power supply terminal and a power-supply side terminal are directly fastened by a bolt and a nut without providing a terminal block. In such a case, a mechanism portion for preventing the power supply terminal from being dragged and rotated by being engaged with a base end side of the power supply terminal may be formed on the outer peripheral surface of a holder.

Although the power supply terminals are formed separately from the busbar main bodies and mounted later in the above embodiment, the present invention can be similarly applied also in the case of using busbars each integrally formed with a power supply terminal and a busbar main body.

Although the number of the busbars, i.e. the number of the power supply terminals is three in the above embodiment, the present invention can be applied also when the number of the busbars (power supply terminals) is two, four or more.

The mounting hole for the nut provided in the terminal block may be so structured as to be open only in the upper surface and able to accommodate the nut with the rotation of the nut prevented.

What is claimed is:

1. A central power supply member for supplying power to windings of a stator of a motor, comprising:
    a plurality of busbars each including one or more connecting terminals connected to the windings, the busbars being arranged one over the other while being insulated from each other;
    power supply terminals associated respectively with the busbars, each of the power supply terminals having a mounting plate joined to the respective busbar, a bent plate extending unitarily and substantially perpendicularly from the mounting plate and a connecting plate extending unitarily and angularly from an end of the bent plate spaced from the mounting plate and configured to be connected by a fastener to a power-supply side terminal drawn out from a power supply, bulging portions projecting from opposite lateral sides of the bent plate; and
    a holder accommodating the busbars therein, the holder having two opposed displacement preventing grooves that slidably accommodate the opposite bulging portions of the bent plate as the busbars are inserted into the holder, the displacement preventing grooves preventing the power supply terminals from being displaced as the fasteners are fastened to the power supply terminals.

2. The central power supply member of claim 1, wherein the holder includes terminal blocks on which the power supply terminals are placed and in which mating fasteners to be engaged with the respective fasteners are mounted with displacement thereof prevented, and the displacement preventing portions are formed in the terminal blocks.

3. The central power supply member of claim 2, wherein the bent plate of the power supply terminal projects substantially radially from the busbar, and the connecting plate of the power supply terminal is placed on the upper surface of the terminal block while the bent plate is placed substantially along a lateral or rear part of the terminal block.

4. The central power supply member of claim 2, wherein the fastening member is a bolt to be threadably engaged with a nut as the mating fastening member and wherein the displacement preventing grooves prevent the power supply terminals from being dragged and rotated as the bolts are tightened by being engaged with the opposite bulging portions of the bent plate of the power supply terminals.

5. The central power supply member of claim 1, wherein:
the connecting plate of the power supply terminal (20) and the power-supply side terminal are in the form of plates including insertion holes for a fastening member and are at least partly placeable one over another; and
the holder includes one or more terminal blocks on which the power supply terminals are to be placed, and a mating fastening member to be engaged with the fastening member is mounted in each terminal block with a specific displacement thereof prevented.

6. The central power supply member of claim 5, wherein the fastening member is a bolt to be threadably engaged with a nut as the mating fastening member and the nut to be threadably engaged with the bolt is mounted in each terminal block with the rotation as the specific displacement thereof prevented.

7. The central power supply member of claim 5, wherein the terminal block includes a mounting hole that is open in an opening surface and at least partly accommodates the mating fastening member with the specific displacement of the mating fastening member prevented, and a clearance for allowing a radial movement of the mating fastening member is provided between the inner surface of the mounting hole and the mating fastening member.

8. The central power supply member of claim 7, wherein:
the nut is formed to have a rectangular plan view and includes flanges projecting at least from two parallel side surfaces; and
the terminal block is in the form of a groove radially projecting from the holder with the mounting hole being open at a projecting end side and facing side walls of the mounting hole are formed with one or more locking portions to be engaged with the flanges of the nut.

9. The central power supply member of claim 7, wherein the power supply terminal is formed with at least one locking claw to be located in an opening of the mounting hole and engaged with the mating fastening member when the power supply terminal is placed on the terminal block.

* * * * *